April 1, 1947.  E. ANDERSON  2,418,151
TRELLIS CONSTRUCTION
Filed Nov. 8, 1944
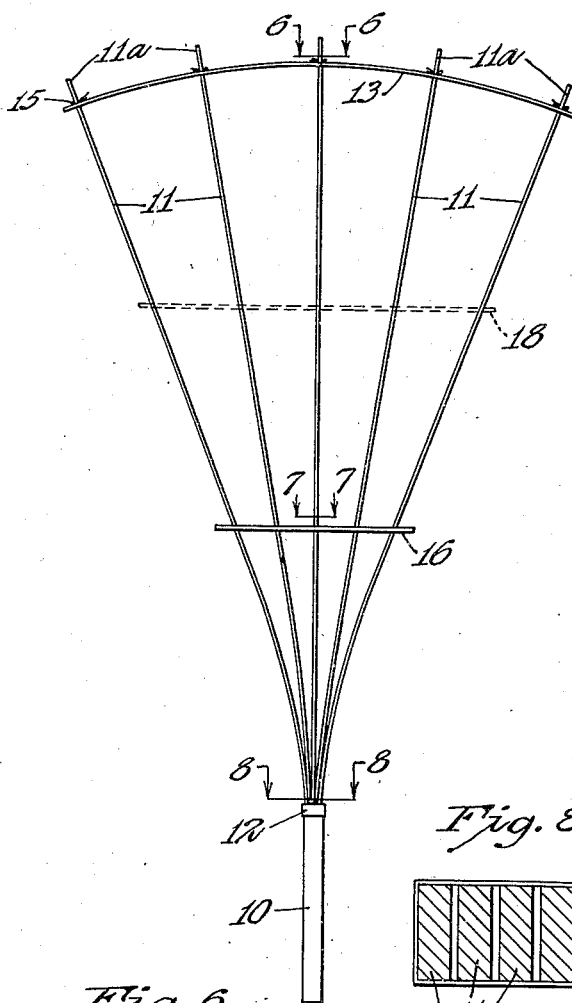
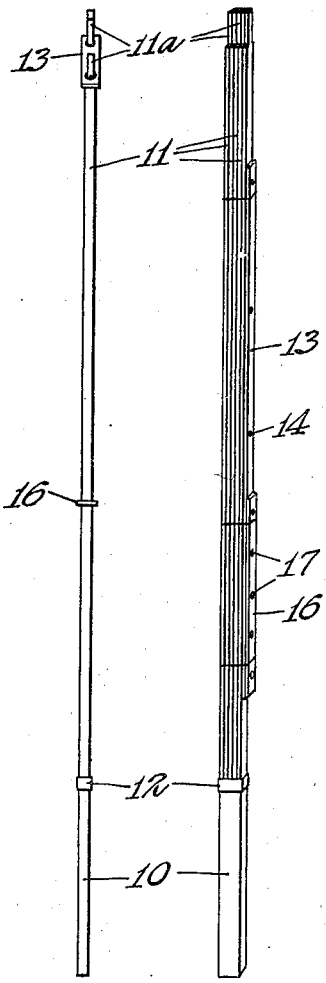
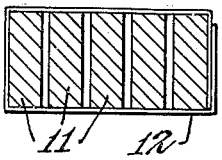
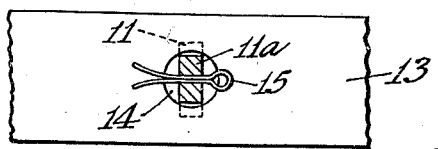
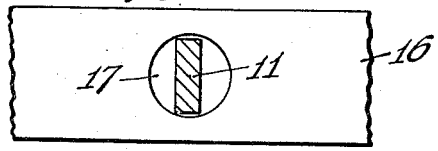
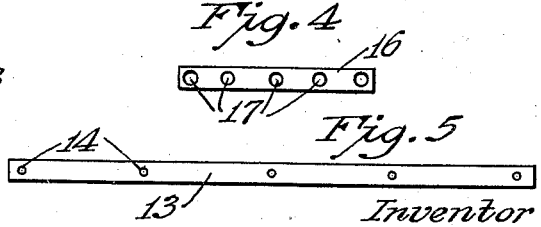
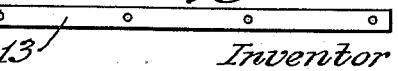
Inventor
Ernest Anderson
By Williamson & Williamson
Attorneys Patented Apr. 1, 1947

2,418,151

UNITED STATES PATENT OFFICE 2,418,151

TRELLIS CONSTRUCTION

Ernest Anderson, Minneapolis, Minn., assignor, by direct and mesne assignments, of one-half to Catherine Anderson, doing business as Kate Manufacturing Company, Minneapolis, Minn., and one-half to Kenneth E. Luger, Minneapolis, Minn.

Application November 8, 1944, Serial No. 562,457

2 Claims. (Cl. 47—47)

This invention relates to a trellis construction.

It is an object of the invention to provide a trellis which can be collapsed into a compact unit for storage and shipment and which can be readily set up for use and again dismantled or collapsed until again needed for further use.

Another object of the invention is to provide a trellis construction made up of a plurality of independently movable arms or branches wherein means is provided for adjustably holding the several arms in various relatively spaced positions to change the shape and general appearance of the trellis.

These and other objects and advantages of the invention will more fully appear from the following description made in connection with the accompanying drawing, wherein like reference characters refer to the same parts throughout the views, and, in which:

Figure 1 is a front elevation of an embodiment of the invention;

Figure 2 is a side elevation thereof;

Figure 3 is a perspective view of the device in its collapsed position;

Figure 4 is a plan view of an adjustable spacer element;

Figure 5 is a plan view of an end spacer element;

Figure 6 is an enlarged section taken on the line 6—6 of Figure 1;

Figure 7 is an enlarged section taken on the line 7—7 of Figure 1; and

Figure 8 is an enlarged section taken on the line 8—8 of Figure 1.

In Figures 1 and 3 there is shown a base member 10 which is preferably formed from a piece of wood. Extending upwardly from an end of the base member 10 and preferably formed integrally therewith is a plurality of trellis arms 11 which are flexible and preferably somewhat resilient. Where the arms 11 meet the base 10 a metal band or tie member 12 is placed about the lower ends of said arms and the upper end of the base 10 to tightly bind the lower ends of the arms and prevent the base from splitting longitudinally when said arms are spread apart, as shown in Figure 1.

The upper ends of the trellis arms 11 are reduced as shown at 11a in Figures 2 and 7. A trellis arm and spacer 13 is provided with apertures 14 which are sufficiently large to fit over the reduced ends 11a of the arms 11 but of insufficient size to receive the remainders of said arms 11. When the ends 11a of said arms are passed through the apertures 14 in the end spacer 13 and cotter pins 15 or similar fasteners are passed through the extension 11a above the spacer 13, the latter is firmly retained on the ends of the arms 11 and they are maintained in spaced relation, as shown in Figure 1.

In Figure 5 there is shown a second arm spacer 16 having apertures 17 which are sufficiently large to receive the main portions of the trellis arms 11. The spacer 16 is, of course, placed on the arms 11 prior to mounting of the end spacer 13. The spacer 16 can be moved to various positions longitudinally of the arms 11 but generally along intermediate portions thereof to vary the spacing between said arms 11 at the points where said spacer 16 crosses and engages said arms. The resiliency of the arms 11 is such that they will frictionally engage the walls of the openings 17 in the spacer 16 so that it will be held in any desired position longitudinally of the arms 11.

If desired another intermediate spacer 18 similar to the spacer 16 but having differently spaced apertures therein can also be placed on the trellis arms 11 for movement and retention in the same manner as the spacer 16.

From the foregoing description it will be seen that I have provided a simply constructed trellis unit which can be collapsed into a very compact form and readily opened up for use. Furthermore, the structure is such that the shapes of the trellis arms 11 can be readily changed by longitudinal adjustment of a spacer such as spacers 16 or 18 which can be slid along the arms of the trellis and which will be retained frictionally in the desired adjusted position.

In addition to the above mentioned features and advantages of the invention it should be noted that the customer or user can quickly set up the trellis without having to resort to the use of nails or screws. It is a structure which can be readily sold as a conveniently packaged product and erected by users who may or may not have any mechanical skill.

While the structure can be conveniently made of wood it is, of course, contemplated that other suitable materials might be used, and it is further understood that various changes may be made in the form, details, arrangement and proportions of the various parts without departing from the scope of my invention.

What I claim is:

1. In a trellis construction, a base, a plurality of spaced flexible arms rising vertically from said base, each of said arms adjacent its free end being provided with an upwardly facing stop member, detachable spacer means disposed over the free ends of the arms and engaging each of said stop members so as to positively limit downward movement of the spacer means and to maintain the free ends of the flexible arms in predetermined spaced relation relative to each other, said spacer means being entirely supported by said arms, second spacer means disposed about and frictionally supported on and entirely by said arms and movable therealong between the base and the first named spacer means for varying and maintaining the relative spacing of the intermediate portions of said arms, and means carried by the free end of each of said arms to prevent separating movement of the first named spacer means from the free ends of said flexible arms.

2. In a trellis construction, a base, a plurality of spaced flexible arms rising vertically from said base each having its upper free end formed with a reduced portion to provide a pair of spaced opposed upwardly facing shoulders spaced inwardly of said free end, detachable spacer means disposed over the reduced portions of said arms and engaging said shoulders so as to prevent downward movement of the spacer means and for holding said arms in fixed determined spaced relation, second spacer means disposed about and frictionally supported on said arms and movable therealong between the base and the first-named spacer means for varying and maintaining the relative spacing of the intermediate portions of said arms, and detachable means connected to the upper ends of said arms above said shouldered portions and the first named spacer means so as to prevent removal of the latter from said arms.

ERNEST ANDERSON.

REFERENCES CITED

The following references are of record in the file of this patent:

UNITED STATES PATENTS

| Number | Name | Date |
| --- | --- | --- |
| 1,953,638 | Smith | Apr. 3, 1934 |
| 1,592,764 | Hamilton | July 13, 1926 |
| 890,948 | Waite | June 16, 1908 |
| 166,766 | Goodspeed | Aug. 17, 1875 |
| 610,803 | Elliott | Sept. 13, 1898 |
| 170,850 | Harding | Dec. 7, 1875 |